United States Patent
Lycett (10) Patent No.: US 8,483,430 B2
(45) Date of Patent: Jul. 9, 2013

(54) METHOD AND APPARATUS FOR DETECTING A TARGET IN A SCENE USING NORMALIZED DATA ELEMENTS

(75) Inventor: Samantha J Lycett, Malvern (GB)

(73) Assignee: Qinetiq Limited, London (GB)

( * ) Notice: Subject to any disclaimer, the term of this patent is extended or adjusted under 35 U.S.C. 154(b) by 1549 days.

(21) Appl. No.: 11/918,066

(22) PCT Filed: Apr. 13, 2006

(86) PCT No.: PCT/GB2006/001357
§ 371 (c)(1),
(2), (4) Date: Oct. 9, 2007

(87) PCT Pub. No.: WO2006/109074
PCT Pub. Date: Oct. 19, 2006

(65) Prior Publication Data
US 2009/0052737 A1 Feb. 26, 2009

Related U.S. Application Data

(60) Provisional application No. 60/685,299, filed on May 27, 2005.

(30) Foreign Application Priority Data

Apr. 14, 2005 (EP) .................................. 05252320

(51) Int. Cl.
*G06K 9/00* (2006.01)
(52) U.S. Cl.
USPC ........................................................ 382/103
(58) Field of Classification Search
None
See application file for complete search history.

(56) References Cited

U.S. PATENT DOCUMENTS 4,780,718 A * 10/1988 Hudson et al. ............... 342/25 A
4,958,224 A * 9/1990 Lepore et al. ................. 348/171

(Continued)

FOREIGN PATENT DOCUMENTS

DE 196 00 086 7/1997
EP 0 443 243 8/1991

(Continued)

OTHER PUBLICATIONS

Beasley et al., "Tarsier/spl R/, a millimetre wave radar for airport runway debris detection", *European Radar Conference*, Oct. 11, 2004, pp. 261-264, XP010771726.

(Continued)

*Primary Examiner* — Bhavesh Mehta
*Assistant Examiner* — Tahmina Ansari
(74) *Attorney, Agent, or Firm* — Nixon & Vanderhye P.C.

(57) ABSTRACT

A method of detecting a target in a scene is described that comprises the step of taking one or more data sets, each data set comprising a plurality of normalized data elements, each normalized data element corresponding to the return from a part of the scene normalized to a reference return for the same part of the scene. The method then involves thresholding (16) at least one of the normalized data elements of each of said one or more data sets. The thresholding step (16) comprises comparing each of the normalized data elements to at least first and second thresholds, wherein the first threshold is greater than the second threshold. The use of one or more confirmation scans (18) in combination with the thresholding step is also described. A radar system is also described that uses the method to detect foreign object debris (FOD) on a surface such as an airport runway.

27 Claims, 5 Drawing Sheets

U.S. PATENT DOCUMENTS

| | | | |
|---|---|---|---|
| 4,972,193 A * | 11/1990 | Rice | 342/90 |
| 5,001,650 A | 3/1991 | Francis et al. | |
| 5,347,282 A | 9/1994 | La Grange et al. | |
| 5,374,932 A * | 12/1994 | Wyschogrod et al. | 342/36 |
| 5,821,896 A * | 10/1998 | Nakano et al. | 342/90 |
| 5,907,568 A | 5/1999 | Reitan, Jr. | |
| 5,937,078 A * | 8/1999 | Hyland et al. | 382/103 |
| 6,042,050 A * | 3/2000 | Sims et al. | 244/3.17 |
| 6,081,753 A * | 6/2000 | Meitzler et al. | 700/90 |
| 6,859,546 B2 * | 2/2005 | Matsukawa et al. | 382/103 |
| 2003/0095714 A1 * | 5/2003 | Avinash | 382/260 |
| 2005/0058021 A1 * | 3/2005 | Feintuch et al. | 367/99 |
| 2006/0140314 A1 * | 6/2006 | Kim et al. | 375/343 |
| 2006/0285665 A1 * | 12/2006 | Wasserblat et al. | 379/114.14 |
| 2007/0217555 A1 * | 9/2007 | Beadle et al. | 375/350 |
| 2009/0052737 A1 * | 2/2009 | Lycett | 382/103 |
| 2009/0067716 A1 * | 3/2009 | Brown et al. | 382/173 |
| 2011/0128180 A1 * | 6/2011 | Fiori et al. | 342/93 |

FOREIGN PATENT DOCUMENTS

| | | |
|---|---|---|
| EP | 1 172 664 | 1/2002 |
| JP | 2001-159678 | 6/2001 |
| WO | 96/35961 | 11/1996 |
| WO | WO 2004068163 A1 * | 8/2004 |
| WO | 2005/096012 | 10/2005 |

OTHER PUBLICATIONS

Go et al., "Third generation airport surface detection equipment design", IEEE, May 23, 1994, vol. 2, pp. 1301-1308, XP002124732.
Ferri et al., "A novel w-band radar for airport traffic monitoring", *IEEE-MSMW2001 Symposium Proceedings*, Jun. 4, 2001, vol. 1, pp. 27-32, XP010555179.
International Search Report for PCT/GB2006/001357 mailed Jul. 18, 2006.
Written Opinion for PCT/GB2006/001357.

* cited by examiner

METHOD AND APPARATUS FOR DETECTING A TARGET IN A SCENE USING NORMALIZED DATA ELEMENTS

This application is the U.S. national phase of International Application No. PCT/GB2006/001357 filed 13 Apr. 2006 which designated the U.S. and claims priority to European Patent Application No. 05252320.6 filed 14 Apr. 2005 and U.S. Provisional Application No. 60/685,299 filed 27 May 2005, the entire contents of each of which are hereby incorporated by reference.

The present invention relates to a constant false alarm rate (CFAR) processing method for detecting a target in a scene. More particularly, the invention relates to a method for processing radar returns that allows the improved detection of foreign object debris (FOD) on an airport runway or the like.

The use of frequency modulated continuous wave (FMCW) millimeter wave radar to detect foreign object debris (FOD) on a runway is known. A FOD detection radar should ideally be able to detect objects of varying sizes (e.g. objects ranging in size from an aircraft engine housing to a nut or bolt) with a minimal false alarm rate in order to avoid disruption to the functioning of the airport. This detection requirement is greatly complicated by the high levels of radar clutter that are typically found in airport environments. It is also well known that there can be considerable difficulties in processing radar data so that any FOD on a runway can be reliably detected over clutter in a wide range of weather conditions and with an acceptably low false alarm rate (e.g. 1 false alarm per day or week).

Constant false alarm rate (CFAR) processing of radar data is also known and has been used previously in radar systems designed to operate in high clutter environments. CFAR processing techniques typically involve knowledge of a probability of false alarm (PFA) curve. A threshold level that will provide the desired false alarm rate (e.g. one false alarm per day) can then be calculated from the PFA curve. In operation, scans acquired by the radar may be normalised by a single average value or a clear scene clutter map and the normalised return for each range-azimuth cell compared to a previously determined threshold level. If the normalised return exceeds the threshold level the radar indicates that a target is present. Although CFAR techniques allow the false alarm rate to be controlled, the inevitable result is that lower false alarm rates require a higher detection threshold thereby reducing radar sensitivity. Those skilled in the art would thus consider CFAR techniques to be incapable of offering both high detection sensitivity and a low false alarm rate.

It is an object of the present invention to provide an improved method for processing radar data and an apparatus for implementing such a method. Moreover, it is a further object of the present invention to provide a method for processing radar data to provide a warning of the presence of foreign object debris on a surface such as an airport runway. It is a yet further object of this invention to provide an improved CFAR processing method.

According to a first aspect of the present invention, a method of detecting a target in a scene comprising the steps of; (a) taking one or more data sets, each data set comprising a plurality of normalised data elements, each normalised data element corresponding to the return from a part of the scene normalised to a reference return for the same part of the scene, and (b) thresholding at least one of the normalised data elements of each of said one or more data sets, characterised in that the thresholding step (b) comprises the step of comparing each of the normalised data elements to at least first and second thresholds, wherein the first threshold is greater than the second threshold.

A method for analysing data from a scene is thus provided in which normalised data elements of one or more data sets are each compared to two or more different thresholds. The normalised data elements may, for example, comprise the radar returns from a number of range-azimuth cells within a scene that are normalised with respect to a clutter map of the scene.

The method of the present invention thus provides a convenient way of separating "big" normalised target returns from the scene (i.e. normalised data elements that exceed the first, big, threshold) and "medium" normalised target returns from the scene (i.e. normalised data elements that exceed the second, medium, threshold but which are below the first threshold.). Furthermore, the thresholding step preferably comprises comparing each normalised data element to at least first, second and third thresholds, wherein said third threshold is lower than said second threshold. The provision of a third threshold also allows "small" normalised target returns (i.e. normalised data elements having a value greater than the third, small, threshold and less than the second threshold) to be detected. Further thresholds (e.g fourth, fifth, sixth etc) of decreasing magnitude can also be provided as required.

The provision of multiple thresholds in accordance with the invention allows "big" targets to be identified whilst ensuring that any lower intensity returns, which may also indicate the presence of smaller (i.e. lower radar cross-section) targets, are not discarded. This is a significant advantage over prior art probability of false alarm (PFA) techniques in which only a single threshold is set and in which any normalised returns that fall below the single threshold are discarded. As described in more detail below, the use of multiple thresholds is particularly advantageous when combined with one or more "confirmation" scans for normalised data elements that exceed the lower (i.e. second or subsequent) thresholds without exceeding the higher (i.e. first) threshold. The method of the present invention can thus be seen to overcome the problem of how to increase detection sensitivity without increasing the false alarm rate.

The present invention advantageously comprises the step of deriving the at least first and second thresholds from probability of false alarm (PFA) data previously calculated for the scene. This step may, for example, involve the use of a probability of false alarm curve. Furthermore, an initial step of generating such PFA data may advantageously be performed, said PFA data generation step comprising the step of taking (e.g. acquiring) a plurality of additional clear scene returns from said scene.

The PFA data generation step may involve taking multiple (e.g. ten) clear scene scans in which each clear scene scan comprises a plurality of radar returns corresponding to different parts (e.g. different range-azimuth cells) of the scene. A clear scene clutter map can then be produced by averaging the returns from the multiple clear scene scans for each part of the scene. Further clear scene scans (e.g. ten or more scans) can be acquired and normalised to the clear scene clutter map thereby allowing probability of false alarm data to be generated which can be used to determine the detection thresholds that are required to provide the desired false alarm rate. More detail about PFA data generation and how the PFA data can be used to set the thresholds is given below.

Advantageously, the step (a) of taking one or more data sets comprises the step of taking a plurality of data sets, wherein the thresholding step (b) is applied to each of said plurality of data sets in turn. In this manner, multiple data sets (e.g. the normalised returns from multiple scans) are thresholded in series. Advantageously, the thresholding step (b) comprises the step of applying different thresholds to different data sets.

Advantageously, the plurality of normalised data elements of successive data sets are derived from returns from the scene acquired during successive time periods. In such a case, the normalised data elements of a data set will contain information about the scene that was acquired during a first time period (e.g. during a first radar scan). All the normalised data elements of a second, successive, data set will then correspond to the scene during a second time period (e.g. during a second scan) that occurs after, and does not overlap with, the first time period. Each data set may thus contain, for example, normalised data elements derived from a radar scan and the returns from successive radar scans may form, after appropriate normalisation, the successive data sets.

Conveniently, the at least first and second thresholds are adjusted between each application of the thresholding step to successive data sets. The step of adjusting said at least first and second thresholds may thus advantageously comprise scaling said thresholds by a correction factor derived from changes in the scene. The correction factor may be derived from the ratio of the mean value of returns from the scene during a second time period to the mean value of returns from the scene during a first time period, wherein the first time period precedes the second time period.

The mean returns of the first and second time periods may conveniently be arranged to exclude any returns from a target within the scene; for example, the returns that provide normalised data elements that are designated as confirmed target detections by the target confirmation step (see below) may be excluded when calculating the correction factor. Scaling the thresholds using such a correction factor allows the false alarm rate to be maintained at the desired level even if the overall returns from the scene change over time. For example, it has been found that the mean value of the returns from a scene are significantly greater when the scene is wet. The use of a correction factor thus allows the thresholds to be increased appropriately so as to maintain the false alarm rate even if it starts to rain. The correction factor may also be used to indicate when a scene has changed significantly; for example, it could be used to indicate that it has started raining.

Advantageously, the method further comprises a target confirmation step, said target confirmation step providing a confirmed target detection output when a normalised data element of one of said plurality of data sets exceeds the first threshold. In other words, a confirmed target detection output is provided by the target confirmation step for any data elements that exceed the first threshold. Such a confirmed target detection output thus indicates the presence of a "big" target.

Furthermore, the target confirmation step may conveniently provide a confirmed target detection output when normalised data elements corresponding to the same part of the scene exceed the second threshold, and are below the first threshold, in at least two successive data sets. Such a confirmed target detection output from the target confirmation step thus indicates the presence of a "medium" target. In other words, any normalised data elements that have a value between the first and second thresholds are only classified as confirmed "medium" target detection outputs if the value of the normalised data element is confirmed in at least one further data set. The use of such a confirmation scan thus decreases the probability of the "medium" target being a false alarm.

In addition, the target confirmation step may advantageously provide a confirmed target detection output when normalised data elements corresponding to the same part of the scene exceed the third threshold, and are below the second threshold, in at least three successive data sets. Such a confirmed target detection output indicates the presence of a "small" target; i.e. any normalised data elements that have a value between the second and third thresholds are only classified as confirmed "small" target detection outputs if the value of the normalised data element is confirmed in at least two further data set. The use of at least two confirmation scan further increases the confidence that the "small" target is real and allows the method to detect targets providing only weak returns.

Alternatively, for improved performance against false alarms, the target confirmation step may be arranged to require at least two detections, wherein a normalised data element corresponding to the same part of the scene exceeds the first threshold in at least two successive data sets.

It should be noted that the terms "big" target, "medium" target and "small" target do not refer to the spatial dimensions of the target in the scene; these terms are used herein to indicate the strength of the return from the part of the scene from which the normalised data element is derived. A skilled person would appreciate that the strength of the radar return from a target is dictated by its radar cross-section, which is determined by target reflectivity, orientation and location etc.

As noted above, appropriate thresholds for use in the thresholding step can be determined using probability of false alarm data acquired for the scene. However, the probability of false alarm associated with a particular threshold will depend on the number of confirmation scans that are used with that threshold. In simple terms, it can be seen that a higher number of confirmation scans would enable the associated threshold to be decreased whilst maintaining a fixed probability of false alarm rate. In other words, the false alarm rate associated with a certain threshold can be decreased by increasing the number of confirmation scans.

It is possible to separately calculate probability of false alarm data for zero, one or two confirmation scans. This provides three separate PFA curves that can be used to set the first, second and third thresholds to provide the desired PFA rate (e.g. one false alarm per day). However, such a technique requires a large number of scans, especially to ensure the PFA data for the lower thresholds is sufficiently accurate. Alternatively, the method may advantageously comprise an initial step of deriving said at least first and second thresholds from probability of false alarm (PFA) data previously calculated for the scene, wherein the at least first and second thresholds are initially derived from the PFA data used to calculate the first threshold. In other words, the PFA data for zero confirmation scans can be extrapolated to enable the second and third thresholds to be determined when using, say, one and two confirmation scans respectively. Setting thresholds using PFA data is described in more detail below.

A single target in the scene may result in a plurality of the normalised data elements within the one or more data sets exceeding the at least first and second thresholds. In other words, each target in the scene may give rise to a large number of confirmed target detection outputs. It should also be noted that, in the case of radar, a strongly reflective target may also produce spatially separated side lobe returns. The method thus conveniently comprises a clustering step, the clustering step being arranged to group confirmed target detection outputs from the target confirmation step and to provide one object detection output for each target in the scene. In other words, the clustering step takes all the confirmed target detections and produces an object detection output for each target. The object detection output may conveniently indicate the physical dimensions (i.e. size) of the target and/or may indicate the location of the object within the scene.

The method also advantageously comprises a target alert step, the target alert step providing a target detection alert when the presence of a object in the scene having a size within a predetermined range is indicated by the clustering step. In this manner, the presence of targets of a certain size, or within a certain range of sizes, can be flagged. The target alert step could thus allow targets that are, for example, greater than a certain size to be ignored. If the method is applied to data from a FOD monitoring radar, aircraft returns could be discounted by the target alert step and only the presence of FOD would trigger an alarm.

Advantageously, the method comprises a normalisation step for calculating the plurality of normalised data elements of each of the one or more data sets, the normalisation step comprising the steps of taking a plurality of returns acquired from the scene and normalising said returns using a clutter map of the scene. It should also be noted that the normalisation step described above is not an essential part of the invention; the method could be readily applied to previously normalised data sets.

The clutter map used in the normalisation step may be initially formed from a plurality of clear scene returns, each clear scene return corresponding to the return from a part of the scene when no target is present in the scene. If appropriate, the initial clutter map used in the normalisation step may be the clear scene clutter map that is used to generate the PFA data from which the at least first and second thresholds are determined.

If the method is applied to a series of data sets acquired during successive time periods, the clutter map used in the normalisation step may be periodically updated. This ensures the clutter map continually provides a good indication of the returns that would be expected from a clear scene. Periodically updating the clutter map also ensures that significant changes in the background returns from scene (e.g. if it rains) do not trigger false alarms or reduce detection sensitivity.

Advantageously, each updated clutter map is formed using the returns from the scene that are also used to generate the normalised data elements of a plurality of said one or more data sets. In other words, the measured returns from the scene (i.e. the returns before application of a normalisation step) can also be used to produce an updated clutter map. An updated clutter map could thus be produced by averaging the returns of, say, a set of ten successive scans of the scene. In this manner, the clutter map can be updated when required without having to acquire clear scene returns.

If continual updating of the clutter map is required, it is possible to generate the updated clutter map in parallel with the normalisation step. For example, a plurality (e.g. ten) of sets of returns could be normalised using a first clutter map, thresholded and the target confirmation step could provide confirmed target detection outputs. The same ten sets of returns could, in parallel with the normalisation step, be averaged to form an updated clutter map. The updated clutter could then be used to normalise the next ten sets of returns. In this manner, the clutter map is continually updated during operation.

The use of returns from a non-clear scene (i.e. a scene that may include a target) to form a clutter map means that it is also typically necessary to exclude any returns from the updated clutter map that are due to such targets. Returns that correspond to parts of the scene in which the target confirmation step has indicated a confirmed target detection output are thus excluded from the updated clutter map. Instead, the previous clutter map values for those parts of the scene are used in the updated clutter map after an appropriate clutter map correction factor is applied. The clutter map correction factor is related to the ratio of the mean of the values contained in the previous clutter to the mean of the values contained in the updated clutter map. A more detailed description of updating clutter maps in this manner is given below.

Advantageously, each normalised data element of the at least one data set corresponds to the normalised return intensity from a range-azimuth cell within the scene. Preferably, the return from the scene from which each normalised data element is derived comprises within beam integrated (WBI) range-azimuth data. The formation of such WBI range-azimuth data from the raw data output of a radar device is known and is described in more detail below.

Preferably, the method also comprises a masking step, the masking step being arranged to remove normalised data elements from each of the one or more data sets that are derived from returns outside of a predetermined area within the scene. In this manner, the method only detects targets within a predetermined portion of the scene. The masking step may, for example, involve defining a runway mask to ensure the method only detects targets located on a runway within the scene. Objects located off the runway are thus ignored.

Advantageously, the step (a) of taking at least one data set comprises reading said at least one data set from a data storage means. In other words, off line processing of data is possible. Alternatively, the step (a) of taking at least one data set comprises the step of obtaining returns from a part of the scene from a radar device. On-line data processing using the method of the present invention may thus be implemented.

Preferably, the scene contains at least part of a runway. In other words, the method can be used to detect the presence of FOD on a runway.

According to a second aspect of the invention, a computer is provided that is programmed to run the method of the first aspect of the invention.

According to a third aspect of the invention, a computer program is provided that can implement the method of the first aspect of the invention. A suitable carrier containing said computer program may also be provided.

According to a fourth aspect of the invention, a radar apparatus is provided that is arranged to implement the method of the first aspect of the invention.

According to a fifth aspect of the invention, a radar apparatus comprises a processor, the processor being arranged to (a) taking one or more data sets, each data set comprising a plurality of normalised data elements, each normalised data element corresponding to the return from a part of the scene normalised to a reference return for the same part of the scene, and (b) threshold at least one of the normalised data elements of each of said one or more data sets, characterised in that the thresholding step (b) comprises the step of comparing each of the normalised data elements to at least first and second thresholds, wherein the first threshold is greater than the second threshold.

Preferably, the apparatus comprises a frequency modulated continuous wave (FMCW) radar device. Advantageously, the FMCW radar device is arranged to transmit radiation having a frequency greater than 35 GHz.

The invention will now be described, by way of example only, with reference to the following drawings in which.

Figure 1:
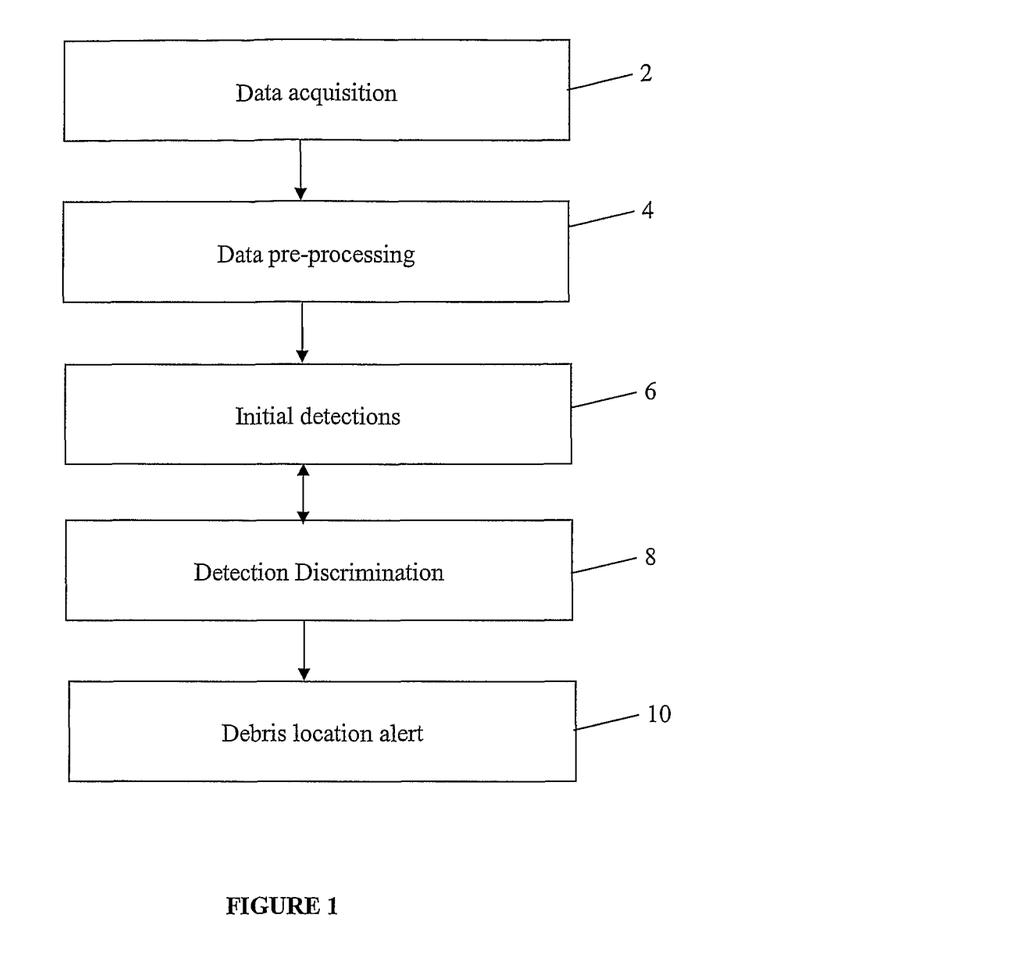
FIG. 1 shows an overview of a method of the present invention.

Referring to FIG. 1, a flow diagram illustrates a processing method of the present invention is shown. The method comprises a data acquisition step 2, a data pre-processing step 4, an initial detections step 6, a detection discrimination step 8 and a debris location output step 10.

The data acquisition step 2 comprises acquiring, or retrieving previously acquired, raw data produced by a radar device. In this example, the raw data comprises in-phase Quadrature (IQ) frequency domain data acquired by a swept frequency modulated continuous wave (FMCW) radar operating at millimeter wave frequencies. However, it should be noted that the technique can be applied to data generated by any device (active or passive) that captures an image from a scene.

The data pre-processing step 4 takes the raw IQ frequency domain data generated by the radar and converts it into intensity range profiles. Sets of intensity range profiles are then weighted and integrated to produce within beam integrated (WBI) range profiles. The WBI step converts raw time domain data output from the analogue-to-digital converter (ADC) of the radar to an intensity range profile. To achieve this, a weighted average of several intensity range profiles is produced for each azimuth bin. This is equivalent to convolving the filter weights, which approximate the two-way azimuthal antenna beam pattern, with intensity range profiles.

The initial detections step 6 is the main detection engine of the method and converts the within beam integrated range profiles into binary confirmed detections data. During the initial detections step 6, the WBI range profiles are normalised with respect to a short term clutter map and are thresholded to give initial detections. Potential targets (i.e. detections) are separated according to their signal to clutter ratio (SCR) by defining three discrete detection thresholds. Cells containing a strong signal to clutter ratio (SCR) that pass the highest threshold are classified as "big targets", cells in which the SCR is above the lowest threshold and below the highest threshold are "medium targets" and cells with weak SCR which pass only the lowest threshold are deemed "small targets". The three thresholds used in this step are derived from a clear scene clutter map and are dynamically updated during operation.

The initial detections step 6 also provides a list of "confirmed" detections. Big targets are classified as confirmed detections straight away. Medium targets are classified as confirmed detections only if they are "confirmed" in the subsequent scan; i.e. two medium targets occur in the same range-azimuth cell on consecutive scans. Small targets are only deemed confirmed detections if they are "confirmed" in the two subsequent scans. The provision of multiple thresholds, and the requirement for additional confirmation scans for targets within a lower SCR band, improves ability of the radar to detect low intensity targets without increasing the false alarm rate. More detail about the initial detections step 6 is given below with reference to FIGS. 2 to 5.

The detection discrimination step 8 generates FOD location data from the confirmed detection output of the initial detections step 6. In particular, the detection discrimination step 8 converts the binary detection output produced by the initial detections step into locations of targets of interest by clustering and centroiding the raw binary detections, such that there is only one final detection per target. Targets that exceed a certain number of detection pixels, and are hence above a predetermined size, are deemed to be aircraft rather than debris and are not reported. The location and extent of the aircraft and debris (FOD) targets determined during the detection discrimination step are also excluded from the short term clutter map used to normalise the WBI data during the initial detections step 6. A more detailed description of the detection discrimination step 8 is given with reference to FIG. 6 below.

Finally, the debris location alert step 10 takes the FOD location data generated by the detection discrimination step 8 and provides a user alert output. The debris location alert step 10 may involve simply sounding an alert or may provide a more detailed indication of where the FOD is located.

Figure 2:
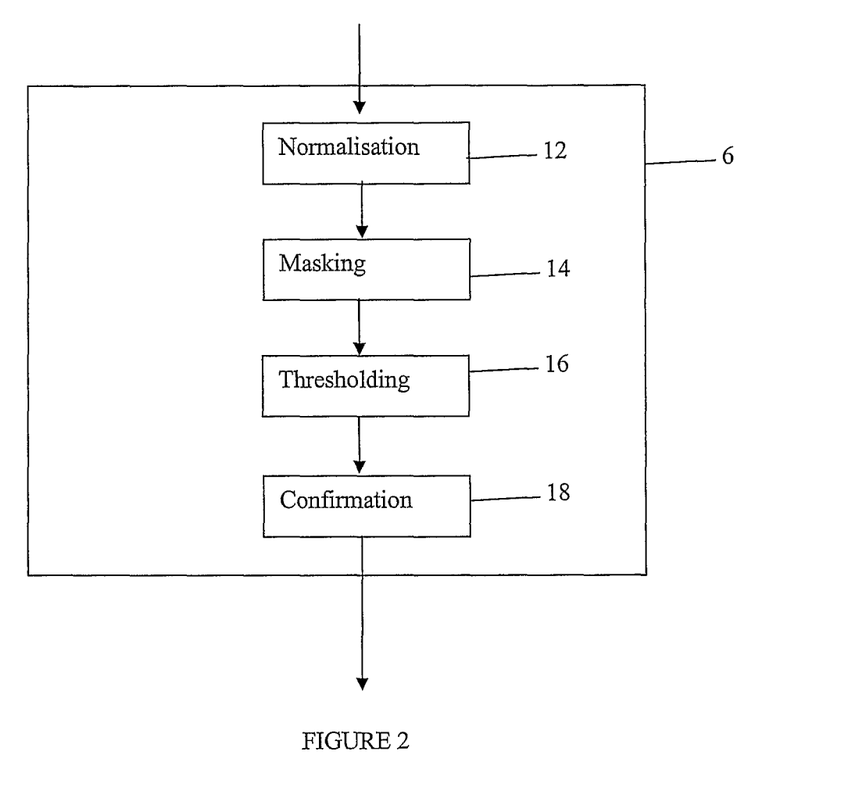
FIG. 2 illustrates the method implemented during the initial detections step of the method outlined in FIG. 1.

Referring now to FIG. 2, the initial detections step 6 of FIG. 1 is described in more detail. The initial detections step 6 comprises a normalisation step 12, a masking step 14, a thresholding step 16 and a confirmation step 18.

The normalisation step 12 comprises taking the WBI range profile from each azimuth bin θ and dividing each value contained therein by the corresponding profile from azimuth bin θ in the completed short term clutter map. Thus if there are no significant differences between the current scan and the short term clutter map, the mean value of the normalised data will be about 1. It should be noted that the short term clutter map used in the normalisation step is continually updated. Short term clutter map formation is described in more detail with reference to FIGS. 3 and 4 below.

After the normalisation step, a masking step 14 is performed in which the normalised WBI range profile produced by the normalisation step 12 is multiplied by the binary runway mask. The runway mask is defined at system initialisation and consists of 1's for range azimuth cells from the region of interest (e.g. the runway) and 0's elsewhere. A resultant masked normalised WBI range profile is thus produced by the masking step 14 that contains the normalised WBI values in the cells of interest and zeros elsewhere.

As noted above, the mask used in the masking step 14 is created on system initialisation. For runway FOD detection, the mask contains 1's in the range-azimuth cells on the runway and 0's elsewhere. Additionally, the runway mask should preferably only contain range-azimuth cells actually from the runway surface, having the odd cell of grass or non-runway surface in the mask can have a detrimental effect on the runway statistics. The mask may be generated manually by an engineer or an automated mask creation technique may be used. Although the formation of a mask is preferred, masking step 14 could be replaced in low complexity situations with a step in which a selection of range cells for each azimuth is defined.

The thresholding step 16 takes the masked normalised WBI range profiles and compares each range azimuth cell to "small", "medium" and "big" thresholds. If the value in a range azimuth cell is greater than or equal to the big threshold, then the range azimuth coordinates of that cell are added to the big detection list. If the value is greater than or equal to the medium threshold, but less than the big threshold then the coordinates are added to the medium detection list. If the value is greater than or equal to the small threshold, but less than the medium (and big) threshold then the coordinates are added to the small detection list. A target sizes array is thus generated from the small, medium and big detections lists.

The three threshold levels used in the thresholding step 16 are initially derived from a clear scene clutter map that is periodically acquired (e.g. each morning or evening) when the scene is guaranteed to be free of any targets. Following acquisition of the clear scene clutter map, a probability of false alarm (PFA) curve is generated from which the initial small, medium and big thresholds are derived. The thresholds are set so as to provide the required false alarm rate for the system (e.g. one false alarm per day). Initial threshold selection, and the process for generating the PFA curve, is described in more detail below with reference to FIG. 5.

It is also described below with reference to FIGS. 3 and 4 how the short term clutter map used in the normalisation step 12 is periodically refreshed. In particular, a new short term clutter map is built up from N (e.g. ten) successive scan whilst the previous short term clutter map is being used in the normalisation step. To account for any changes in the external conditions (e.g. rain) that may have occurred since the last clutter map update, the thresholding step 16 comprises an initial threshold adjustment step. The initial threshold adjustment step comprises scaling the existing thresholds by a correction or so-called "runway ratio". The runway ratio is simply the mean cell intensity of the current normalised WBI data, but excluding those cells identified as containing medium or big detections. However, it is preferable to ensure that the threshold values resulting from the threshold adjustment step do not drop below the original thresholds calculated from the clear scene clutter map; i.e. the clear scene clutter map is acquired for a clear dry scene. Once the thresholds have been updated using the runway ratio, the values in the masked normalised WBI range profile are re-compared to the updated big, medium and small thresholds.

The confirmation step 18 takes the target sizes array generated during the thresholding step 16 which contains the list of small, medium and big detections. All big detections are immediately added to a confirmed detection list. If a medium detection occurs in the same range-azimuth cell in the current and previous scan, then the location of those medium detections are also added to the Confirmed Detection list. If a small detection occurs in the current scan and the two immediately preceding scans, then the location of those small detections is also added to the confirmed detection list. The confirmation step 18 thus decreases the probability of the medium and small detections being false alarms by performing one or two confirmation scans respectively. The confirmation step 18 thus creates a confirmed detections list from the detections list generated by the thresholding step 16.

Figure 3:
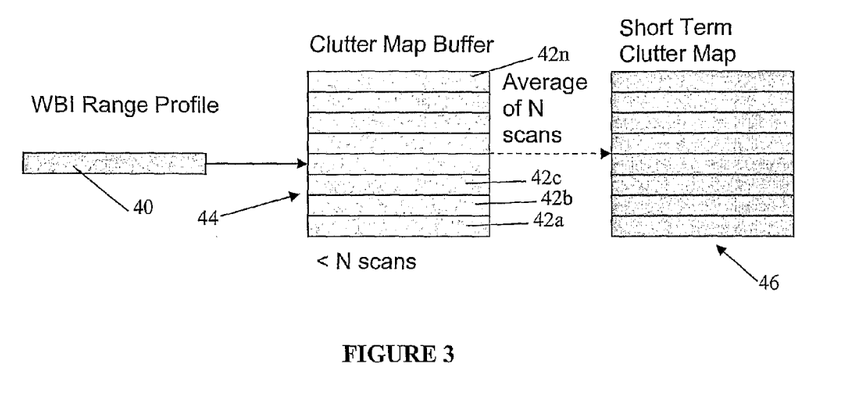
FIG. 3 illustrates a technique for clutter map formation.
Figure 4:
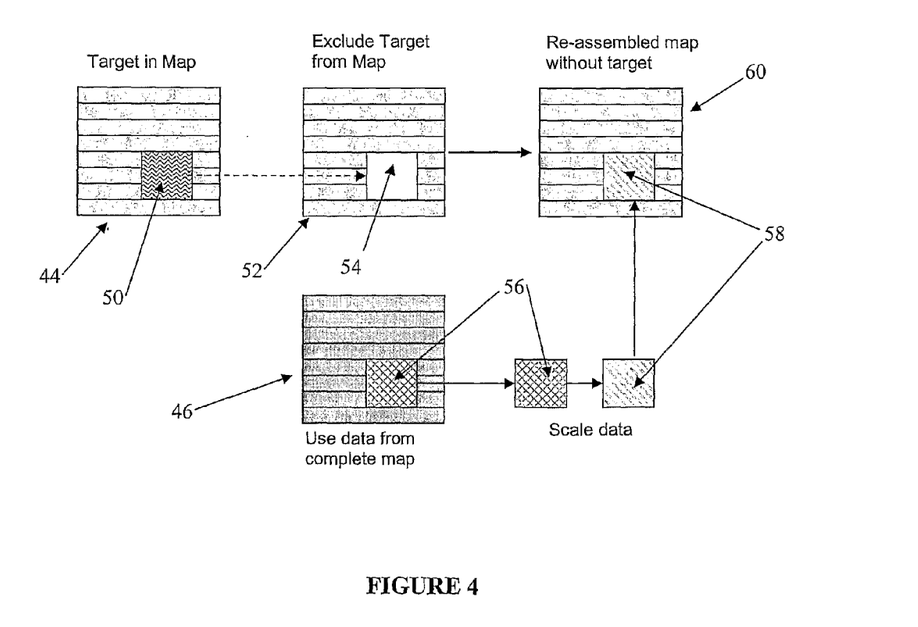
FIG. 4 shows how target returns can be removed during clutter map formation.

Referring now to FIGS. 3 and 4, the formation of the short term clutter map for use in the normalisation step 12 of the initial detections step 6 is described. In short, the short term clutter map is built up from N radar scans with returns from known targets excluded. The short term clutter map is intended to provide a current estimate of clear scene values at every range-azimuth cell.

FIG. 3 illustrates the basic principle of clutter map formation. Each WBI range profile 40 acquired by the radar is loaded into the appropriate azimuth bin location 42a-42n of a clutter map buffer 44. Once N (e.g. ten) complete scans have been loaded in to the clutter map buffer 42, each range azimuth cell in the clutter map will thus contain the sum of N within beam integrated returns. Each range azimuth cell of the clutter map buffer is then divided by N, such that each range azimuth cell contains the average of N returns. The averaged data is then output from the clutter map buffer 44 and forms the short term clutter map 46. In this manner, a short term clutter map is available for use in the normalisation step 12 whilst a new clutter map is being built up.

The short term clutter map is intended to provide a clear scene reference for normalisation purposes. Consequently, any targets that are present in the scene whilst a new short term clutter map array is being constructed should not be added to that clutter map.

FIG. 4 illustrates a technique for removing target returns during the process of constructing a new short term clutter map. As described with reference to FIG. 3, a clutter map buffer 44 is loaded with WBI range profiles for multiple azimuth bins. If a target is present in the scene, a portion 50 of the clutter map buffer 44 will contain radar returns from that target. As outlined above with reference to FIG. 1, any confirmed targets in the scene are identified by the detection discrimination step 8. It is thus possible to identify (i.e. using the confirmed detections list) any portion 50 of the clutter map buffer 44 that corresponds to a target and to thus exclude such a target return from the clutter map. A modified clutter map buffer 52 is thus produced having a region 54 in which target returns have been excised.

The short term clutter map is used to normalise all the returned radar data and the hole in the modified clutter map 52 is thus filled using data from the existing (i.e. complete) short term clutter map 46. This is achieved by taking data 56 from the short term clutter map 46 that corresponds to the range azimuth cells of the region 54 of the modified clutter map buffer 52. To account for any changes (e.g. rain) that may have occurred, the data 56 from the short term clutter map 46 is scaled using the clutter map scaling factor to form scaled data 58. The scaled data 58 is then combined with the modified clutter map 52 to form a re-assembled clutter map 60. The re-assembled clutter map 60 is then used as the short term clutter map whilst data for the subsequent short term clutter map is collected.

The clutter map scaling factor used to produce the scaled data 58 is the ratio of the mean intensity of the immature clutter map (appropriately normalised to account for the incomplete number of scans that the immature clutter map contains) to the mean intensity of the previous (complete) clutter map. The mean intensity of a clutter map is simply the mean value of all range azimuth cells of interest (e.g. all the non-masked cells). Under normal conditions the clutter map scaling factor should be very close to unity. However if it starts to rain, then the runway mean of the map under construction will increase and hence the clutter map scaling factor will also increase. In fact, it has been found during testing that the runway mean can increase by a factor of 10, even under light rain.

It should be noted that the clutter map scaling factor may be used for a number of other purposes. For example, the presence of rain may be deduced from the value of the runway mean of the current scan with any confirmed targets excluded. If the runway mean exceeds a certain predetermined value (e.g. if the mean increased 6 dB above the runway mean value measured in dry conditions) then a rain flag could be set. A number of changes to the radar could be implemented when such a rain flag is set; for example, the polarisation of the system could switched from cross to co-polarisation.

Figure 5:
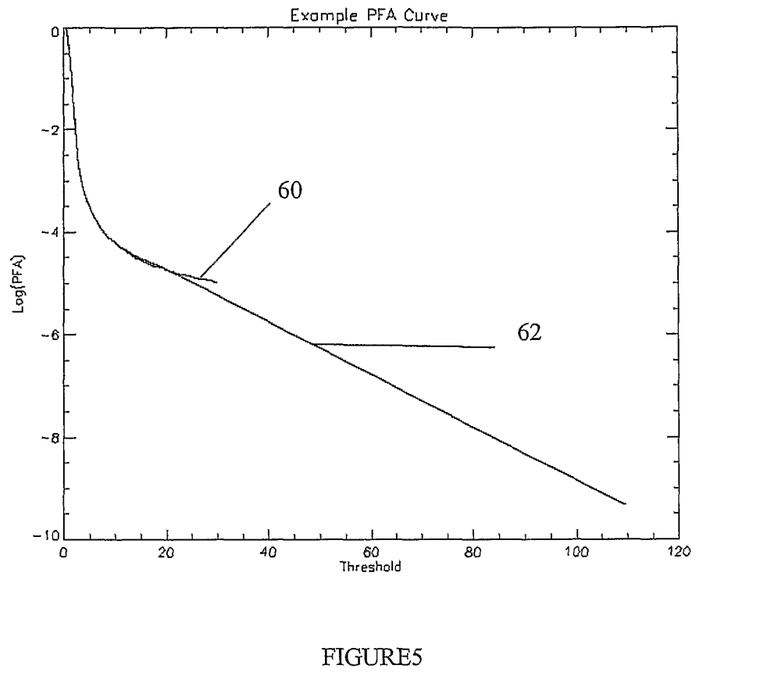
FIG. 5 illustrates a probability of false alarm (PFA) curve and a linear extrapolation of the tail of the PFA curve.

Referring now to FIG. 5, the formation of a PFA curve from which the initial small, medium and big thresholds are created is described.

As noted above, the clear scene clutter map is acquired when the scene is guaranteed to be clear of targets (e.g. when the airport is shut) and is preferably initiated by an engineer. The clear scene clutter map is an average of N scans of WBI data; a value of N of ten is typically sufficient. Preferably the clear scene clutter map is produced from at least the same number of scans that are used to form the short term clutter map. It should also be noted that the clear scene clutter map can be used as the very first short term clutter map of the day.

The probability of false alarm (PFA) curve is generated from M (where M is, say, ten) scans worth of additional clear scene masked WBI profiles that are normalised with respect to the clear scene clutter map. At least the same number of scans of additional clear scene data should be used to generate the PFA curve as the number that were used to generate the medium term clutter map.

The probability of false alarm (PFA) for a threshold T can then be defined as follows:

$$PFA(T) = \int_T^\infty p(x)dx \qquad (1)$$

where p(x) is the probability density function of the normalised intensities, and:

$$\int_0^\infty p(x)dx = 1 \qquad (2)$$

A discrete probability density function (P(T)) for clear scene masked normalised WBI data is then generated by forming a histogram of the data.

Once the required number of scans worth of data have been processed, the histogram is normalised such that sum (i.e. total) of all the bins is 1. Such a normalised histogram represents the discrete probability density function. The discrete probability of false alarm curve (PFA(T)) is then generated from the discrete probability density function by calculating cumulative probability density function, and subtracting it from 1:

$$\sum_{x=0}^{x=\infty} P(x) = 1 \qquad (3a)$$

$$C(T) = \sum_{x=0}^{x=T} P(x) \qquad (3b)$$

$$PFA(T) = 1 - C(T) \qquad (3c)$$

A skilled person would appreciate that the discrete PFA curve could be calculated in a number of alternative ways; for example, it would be possible to calculate the fraction of data values that are greater than or equal to a threshold T.

Once the probability of false alarm curve has been generated, the thresholds required to achieve a desired false alarm rate can be extracted. However, to measure the threshold for which a generated PFA curve provides a false alarm rate that equates to, say, one per day, it should be appreciated that at least one day's worth of data is ideally required. In most circumstances the acquisition of a whole days data is impractical and hence a PFA curve that is calculated using fewer scans can be extrapolated. In other words, the probability of false alarm curve is extrapolated so that thresholds corresponding to lower probability of false alarms (e.g. 1 per day) can be found.

FIG. 5 shows a PFA curve 60 calculated using the above technique. It can be seen that the tail of the Log(PFA) curve is close to linear. Line 62 is a linear best fit to the tail of the Log(PFA) curve; the tail is the portion of the log(PFA) curve between a tail start of around $10^{-4}$ and a tail end corresponding to the lowest measurable accurate log(PFA).

A typical runway mask, covering a scan angle of 180° degrees, would typically contain approximately 600,000 range-azimuth cells. If the scan time for 180° was 72 seconds, there would be approximately 1,200 scans per day which equates to around $7.2 \times 10^8$ range-azimuth cells per day. Taking a desired overall false alarm rate of one per day, the required probability of false alarm per acquired range-azimuth cell would be around $1.389 \times 10^{-9}$, which equates to a log PFA of around −8.8573. In the case of no confirmation scans, the required detection threshold is thus the threshold at which log(PFA)=−8.8573 which, from the extrapolated curve 62, can be seen to be around 100.

The threshold set by the requirement that log(PFA)=−8.8573 is strictly only applicable to single scan detection. For detections (e.g. small and medium detections) that use one or two confirmation scans, the probability of false alarm calculation should take into account the final probability of false alarm after such confirmation. This means that lower thresholds, and therefore bigger probabilities of false alarms, can be set when the data is thresholded in the manner described above using one or more confirmation scans.

Of course, other embodiments of the invention may have alternative arrangements regarding confirmation scans. For example, an alternative embodiment may be arranged to carry out confirmation scans for all detections, be they small, medium or big. The PFA may be adjusted accordingly to account for the additional scans as described above.

The actual probability of false alarm curves after one or two confirmation scans can be calculated directly. However, this is computationally expensive and requires a large number of clear scene data scans to be acquired. It has been found that it is possible to reliably approximate the confirmation PFA curves from a no-confirmation PFA curve of the type described above.

In particular, it has been found that for false alarms that are not correlated from scan to scan, the probability of getting a false alarm M times out of N(q) is given by the binomial coefficient:

$$q_{M,N} = \frac{N!}{M!(N-M)!} p^M (1-p)^{M-N} \qquad (4)$$

where p is the probability of getting a false alarm in a single scan.

The probability of getting a false alarm M=2 times out of N=2 scans (i.e. a scan and a confirmation scan) is thus:

$$q_2 = \frac{2!}{2!0!} p^2 (1-p)^0 = p^2 \qquad (5)$$

Similarly the probability of getting a false alarm M=3 times out of N=3 scans (i.e. a scan and two confirmation scans) is:

$$q_3 = p^3 \qquad (6)$$

Consequently, if the false alarms were uncorrelated, then the final PFA curve for one-confirmation scan ($q_2$) may be approximated by raising the no-confirmation scan PFA (p) curve to the power two. Similarly the final two confirmation scan PFA curve ($q^3$) may be approximated by raising the no-confirmation scan PFA curve (p) by the power three.

In reality, false alarms do tend to be correlated from scan to scan. To account for this the no-confirmation scan PFA curve can be raised to slightly smaller powers which can be determined from analysis of trials data.

For a desired PFA of Q (corresponding to 1 per day for example), the PFA required in a single scan, assuming that one or two confirmation scans will also be performed is P, where:

$$P^N = Q \qquad (6a)$$

$$\log(P) = \log(Q)/N \qquad (6b)$$

In the present example, Log(P) thus equals:
(i) −8.86 (i.e. log(Q)) for no confirmation scans,
(ii) −5.3 for one confirmation scan; and
(iii) −3.89 for two confirmation scans.

Taking the above values of log(P) enables the initial small, medium and big (signal to clutter) detection thresholds to be set to provide the desired false alarm rate. These thresholds are used in the thresholding step 16 that is described above with reference to FIG. 3.

Figure 6:
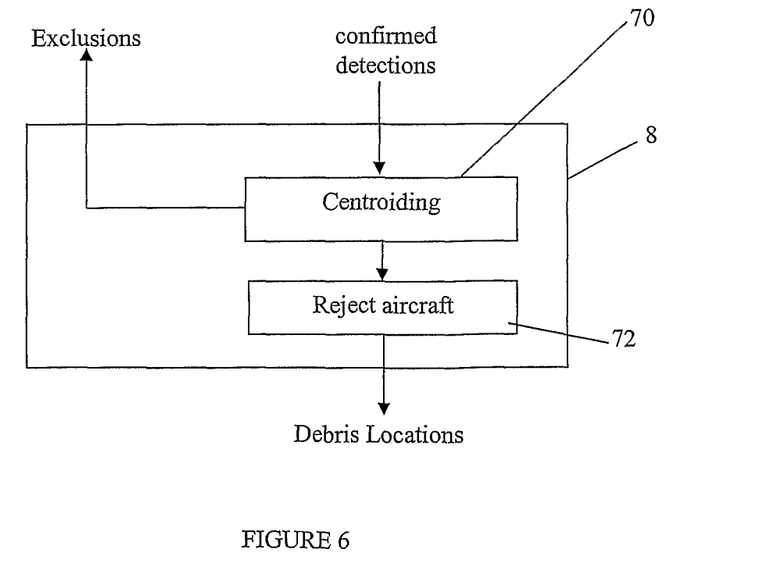
FIG. 6 illustrates the method implemented during the detection discrimination step of the method outlined with reference FIG. 1.

Referring to FIG. 6, the detection discrimination step 8 outlined with reference to FIG. 1 is described in more detail. In particular, detection discrimination step 8 can be seen to comprise a centroiding step 70 and a aircraft rejection step 72.

A target, even a spatially small one, may result in more than one confirmed detection during the initial detections step 6. These multiple confirmed detections may arise from overlapping azimuth bins or bright side lobes. To convert a cluster of detections into a single target report, the centroiding step 70 calculates the centroid of the cluster. It should be noted that some regions of the target (or more probably a target plus the associated target side lobes) may not be sufficiently bright to give rise to a confirmed detection. This can result in a disconnected target blob. To counteract this effect, the confirmed detections are dilated prior to clustering. The number of pixels to dilate in range and azimuth (the dilation mask) is typically fixed at system initialisation and does not vary significantly between radar installation sites.

Following the centroiding step 70, the aircraft rejection step 72 is performed. The aircraft rejection step 72 determines whether any of the clustered targets contain a number of confirmed detection pixels greater to equal to an 'aircraft threshold'. In other words, targets in the scene containing more than a certain number of pixels are assumed to be aircraft and are thus excluded from the list of detected FOD. Advantageously the spatial size of the target can be related to the number of confirmed detection pixels within a cluster. The rejection of clustered targets above the aircraft threshold allows the FOD detection radar to operate when the runway is in use. Additionally, any final centroided detection positions occurring within the azimuth range of the rejected target can also rejected. This rejection is because large targets such as aircraft cause large side lobes ('flashes') which can extend across the whole range profile, and may be misinterpreted as additional targets.

The aircraft threshold may be selected as required for a particular installation or it may be varied as required during use. Appropriate selection of the aircraft threshold would enable the system to sound an alarm when baggage lorries, fire engines etc are on the runway but not when a large aircraft lands. The exact threshold will thus be set for the particular requirement. The aircraft threshold may be range dependent. For example, the threshold above which a target is assumed to be an aircraft may be arranged to decrease with the detected range of the target, to take into account the reduced signal levels, and therefore reduced number of detection pixels, from more distant targets.

It should also be remembered that exclusions determined during the centroiding step 70 are fed back to the initial detections module so that they can be excluded from the short term clutter map that is being generated. In particular, it should be noted that these exclusions are provided to the initial detections module before application of the aircraft rejection step 72.

Figure 7:
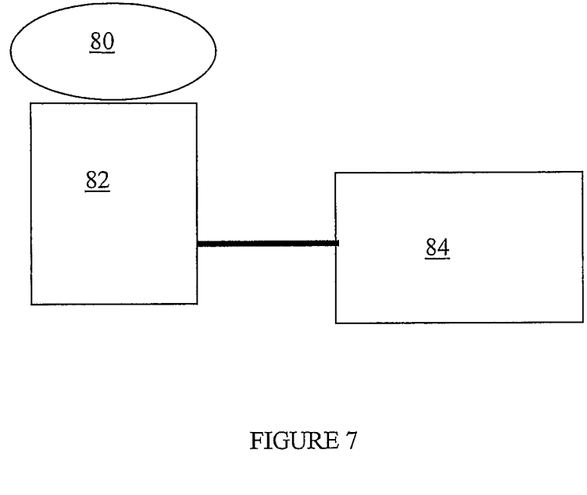
FIG. 7 illustrates a radar for implementing the method of the invention.

Referring now to FIG. 7, a radar for implementing the above described method is shown. The radar comprises an antenna 80, radar electronics 82 and a processor 84. The radar electronics 82 produces the FMCW signal that is transmitted by the antenna 80 to the scene and also generates the in-phase & quadrature return signals that are fed to the processor 84. The processor 84, which may be a personal computer or the like, is arranged to implement the method described above with reference to FIG. 1 to 6.

A skilled person would appreciate that the antenna, radar electronics and processor may be co-located or provided at different locations. For example, the IQ return signal produced by the radar may be transmitted to a processor 84 sited in a remote location, such as a control room, via a standard link (e.g. over a wired or wireless network link).

The above example is directed to the detection of FOD on a runway. The skilled person would appreciate that the above method may be applied to numerous alternative radar applications and even to non-radar devices. For example, the method is applicable to any technique that involves monitoring a surface or region of space for the presence of an object. Other uses and benefits of the technique would also be immediately apparent to those skilled in the art.

The invention claimed is:

1. A method of detecting a target in a scene comprising the steps of;
    (a) taking one or more data sets, each data set comprising a plurality of normalised data elements, each normalised data element corresponding to the return from a part of the scene normalised to a reference return for the same part of the scene, and
    (b) thresholding at least one of the normalised data elements of each of said one or more data sets and comparing each of the normalised data elements to at least first and second thresholds, wherein the first threshold is greater than the second threshold, and, based upon said thresholding step, creating a target size array according to radar cross-section of the target.

2. A method according to claim 1 wherein said thresholding step comprises comparing each normalised data element to at least first, second and third thresholds, wherein said third threshold is lower than said second threshold.

3. A method according to claim 1 and further comprising the step of deriving said at least first and second thresholds from probability of false alarm (PFA) data previously calculated for the scene.

4. A method according to claim 3 and further comprising an initial step of generating said PFA data, said PFA data generation step comprising the step of taking a plurality of additional clear scene returns from said scene.

5. A method according to claim 1 wherein the step (a) of taking one or more data sets comprises the step of taking a plurality of data sets, wherein the thresholding step (b) is applied to each of said plurality of data sets in turn.

6. A method according to claim 5 wherein the thresholding step (b) comprising the step of applying different thresholds to different data sets.

7. A method according to claim 5 wherein the plurality of normalised data elements of successive data sets are derived from returns from the scene acquired during successive time periods.

8. A method according to claim 7 wherein said at least first and second thresholds are adjusted between each application of the thresholding step to successive data sets.

9. A method according to claim 8 wherein the step of adjusting said at least first and second thresholds comprises scaling said thresholds by a correction factor, the correction factor being derived from the mean value of the normalised data elements excluding those elements identified as containing targets.

10. A method according to claim 7 and further comprising a target confirmation step, said target confirmation step providing a confirmed target detection output when a normalised data element of one of said plurality of data sets exceeds the first threshold.

11. A method according to claim 7 and further comprising a target confirmation step, the target confirmation step providing a confirmed target detection output when normalised data elements corresponding to the same part of the scene exceed the second threshold, and are below the first threshold, in at least two successive data sets.

12. A method according to claim 2 wherein the step (a) of taking one or more data sets comprises the step of taking a plurality of data sets, wherein the thresholding step (b) is applied to each of said plurality of data sets in turn, and wherein the plurality of normalised data elements of successive data sets are derived from returns from the scene acquired during successive time periods, the method further comprising a target confirmation step, the target confirmation step providing a confirmed target detection output when normalised data elements corresponding to the same part of the scene exceed the third threshold, and are below the second threshold, in at least three successive data sets.

13. A method according to claim 10 comprising a clustering step, said clustering step being arranged to group confirmed target detection outputs from the target confirmation step and to provide one object detection output for each target in the scene.

14. A method according to claim 13 wherein each object detection output indicates the spatial dimensions of the associated target.

15. A method according to claim 14 and further comprising a target alert step, the target alert step providing a target detection alert when the presence of a target in the scene having a size within a predetermined range is indicated by the clustering step.

16. A method according to claim 1 and further comprising a normalisation step for calculating the plurality of normalised data elements of each of the one or more data sets, the normalisation step comprising the steps of taking a plurality of returns acquired from the scene and normalising said returns using a clutter map of the scene.

17. A method according to claim 16 wherein said clutter map is initially formed from a plurality of clear scene returns, each clear scene return corresponding to the return from a part of the scene when no target is present in the scene.

18. A method according to claim 16 wherein the step (a) of taking one or more data sets comprises the step of taking a plurality of data sets, wherein the thresholding step (b) is applied to each of said plurality of data sets in turn, and wherein the plurality of normalised data elements of successive data sets are derived from returns from the scene acquired during successive time periods, and wherein the clutter map used in the normalisation step is periodically updated, and each updated clutter map is formed using returns from the scene that are used to generate the normalised data elements of a plurality of said one or more data sets.

19. A method according to claim 1 wherein each normalised data element of the at least one data set corresponds to the normalised return intensity from a range-azimuth cell within the scene.

20. A method according to claim 19 wherein the return from the scene from which each normalised data element is derived comprises within beam integrated (WBI) range-azimuth data.

21. A method according to claim 1 comprising a masking step, the masking step being arranged to remove normalised data elements from each of the one or more data sets that are derived from returns outside of a predetermined area within the scene.

22. A method according to claim 1 wherein the step (a) of taking at least one data set comprises one of a) reading said at least one data set from a data storage means and b) obtaining returns from a part of the scene from a radar device.

23. A method according to claim 1 wherein the scene contains at least part of a runway.

24. A computer program product including a non-transitory computer readable storage medium which, when loaded on a computer implements the method of claim 1.

25. A radar apparatus comprising a processor, the processor being configured to:
  (a) take one or more data sets based upon radar returns of said radar apparatus, each data set comprising a plurality of normalised data elements, each normalised data element corresponding to a radar return from a part of the scene normalised to a reference return for the corresponding part of the scene; and
  (b) threshold at least one of the normalised data elements of each of said one or more data sets by comparing each of the normalised data elements to at least first and second thresholds, wherein the first threshold is greater than the second threshold, said processor, based upon said thresholding step, configured to create a target size array according to a target radar cross section.

26. An apparatus according to claim 25 that comprises a frequency modulated continuous wave (FMCW) radar device.

27. An apparatus according to claim 26, wherein the FMCW radar device is arranged to transmit radiation having a frequency greater than 35 GHz.

* * * * *